Jan. 17, 1933.    J. SCHOENFELD    1,894,545
ICE CREAM CONE
Filed March 16, 1931

INVENTOR.
JOSEPH SCHOENFELD.
BY
ATTORNEYS.

Patented Jan. 17, 1933

1,894,545

UNITED STATES PATENT OFFICE

JOSEPH SCHOENFELD, OF SAN FRANCISCO, CALIFORNIA

ICE CREAM CONE

Application filed March 16, 1931. Serial No. 522,925.

This invention relates to edible containers and especially to that type known as ice cream cones.

Ice cream cones are made of an edible material such as batter or paste baked to a golden brown color. They are usually cone shaped and when ice cream is to be served the ice cream is molded and packed into the open upper end of the cone. A considerable portion of the ice cream projects above the upper end of the cone and a portion of the ice cream projects beyond the rim of the cone, hence when the ice cream begins to melt it tends to run down the outer surface causing dripping, soiling of the fingers, clothing, etc.

The object of the present invention is to generally improve and simplify the construction and operation of edible containers of the character described; to provide a cone which is so constructed that soiling of the fingers and clothing is substantially prevented; and, further, and more specifically stated, to provide a cone having an annular flange formed thereon and at a point below the upper open end of the cone, said flange forming an annular trough to collect melting ice cream running down the exterior surface, and said cone having openings formed in the side wall thereof and in communication with the trough so as to direct the melted material into the interior of the cone where it will run down the inner surface and finally collect in the bottom of the cone.

The edible ice cream cone is shown by way of illustration in the accompanying drawing, in which—

Figure 1:
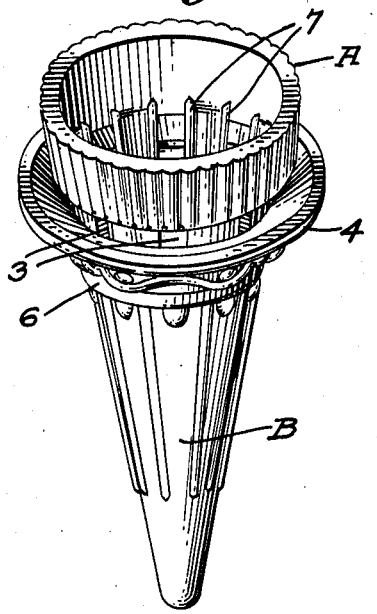
Fig. 1 is a perspective view of the cone.
Figure 3:
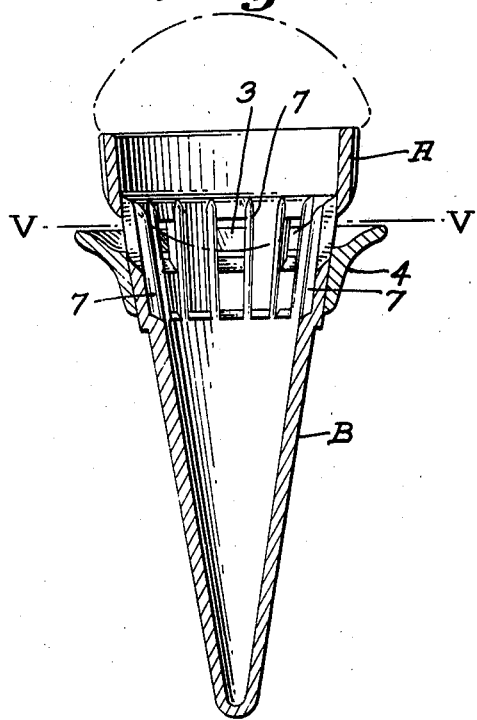
Fig. 3 is a central, vertical, longitudinal section of the cone.

Referring to the drawing in detail and particularly Figs. 1 and 3, it will be noted that the cone is made in two sections. An upper section A and a lower section B. These sections are connected by webs 2 and the webs are interspaced so as to form intermediate openings 3, the function of which will hereinafter be described.

Mounted on the exterior surface of the cone is an annular flange 4. The upper end of this flange forms an annular trough and this communicates with the openings 3 which will hereinafter be referred to as drain openings. The flange 4 may be formed integral with the cone during the molding and baking operation as shown in Fig. 1, or it may be formed separate therefrom. In that case a smooth unornamented surface such as shown at 6 is formed between the two cone sections A and B and the flange 4 is molded separately. The two articles are shipped to the retailer in the usual way and are there assembled when the ice cream is to be served.

Figure 2:
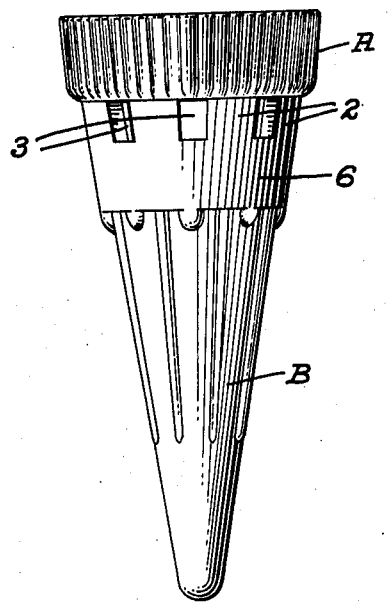
Fig. 2 is a side elevation of the cone showing the annular flange removed.

When the retailer applies the flange 4 he may employ an adhesive in the form of a syrup or the like so as to prevent the flange from accidentally dropping off when the ice cream is being eaten. The smooth surface 6 is cone shaped and so is the inner surface of the flange, hence frictional fit and contact is made and if an adhesive flavoring syrup or the like is employed in addition thereto any tendency of the flange dropping off is eliminated. The exteriorly surfaces of the cone sections A and B may be suitably ornamented as shown in Figs. 1 and 2 and so may the exterior surface of the flange 4. The webs 2 connecting the upper and lower section of the cone are preferably reinforced on their inner surfaces by means of ribs such as shown at 7. These ribs materially strengthen the connection between the cone sections and they furthermore form a partial seat to retain the ice cream in the upper end of the cone as shown in Fig. 3.

In actual practice it may be stated that where the annular flange 4 is formed integral with the cone it is only necessary for the retailer to mold the ice cream and to force it into the upper end of the cone and if the flange is made separate from the cone it is only necessary to apply a syrup to the exterior smooth surface 6 and slip the collar into place. In either instance the ice cream is placed in the upper end of the cone in the usual way and the ice cream is eaten from the upper end of the cone in the usual way.

During warm weather the ice cream has a tendency to melt fairly rapidly and under such conditions a certain amount of melted ice cream will run down the exterior surface of the section A. Melted cream running down the exterior surface when cones of this character are employed will be caught in the annular trough formed by the flange 4 and as the drain openings 3 are in communication therewith the melted cream will be directed through the drain openings into the interior of the cone where it will drain down the inner surface and collect in the bottom portion B, hence preventing dripping, soiling of the fingers and clothing, etc.

The largest percentage of cones sold are consumed by children. When the ice cream is served in ordinary cones the children have a tendency to nibble away at the upper edge of the cone and this promotes the tendency for the ice cream to melt and run down the exterior surface. Also the children have a tendency to get their fingers over the edge of the cone and into the ice cream, thus soiling the same even though there is no melting of the cream. In the present instance the flange 4 not only functions as a trough to receive drainage but it also functions as a guard to keep the fingers away from the ice cream. It also functions as a handle in holding the cone as it is so large in diameter by being flared outwardly as to avoid any danger of the cone slipping through the hands of the child and falling on the floor or otherwise.

Figure 4:
Fig. 4 is a side elevation of the annular flange which is applied to the exterior surface of the cone.
Figure 5:
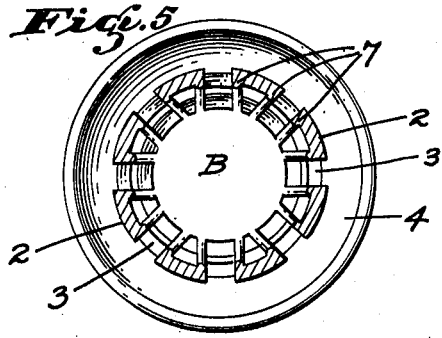
Fig. 5 is a cross section taken on line V—V of Fig. 3.

The cone shown in the present instance is of standard size and shape and as such lends itself to nesting when the cones are packed for shipment, etc. By being standard in size and shape it is readily filled in the usual manner and just as readily eaten from. It has already been stated that the cone is made of an edible batter baked to a golden or brown color. Many individuals, particularly children, enjoy eating the baked batter and for this reason the syrup adhesive which secures the flange 4 may contain a flavoring material so that this together with the batter can be eaten when the ice cream has been consumed. Where a detachable flange is employed as shown in Figs. 3 and 4, it is not absolutely essential that it be made of edible material. While I prefer to make it of an edible material, I wish it understood that it may be made of another material such as papier-mâché, pressed paper or the like and as such can be thrown away if it is desired to eat the cone. While other features of the invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. An edible ice cream container comprising a hollow conical member having an open ended upper section to receive and support a mass of ice cream, a conical lower section formed integrally with the upper section, the exterior diameter of the lower section being the same as the interior diameter of the upper section at the point of junction therebetween, said lower section being formed with openings through its side immediately below the lower end of the upper section, and an annular flange on the lower section circumscribing the same immediately below the openings to receive drippings and direct them through said openings.

2. An edible ice cream container comprising a hollow conical member having an open ended upper section to receive and support a mass of ice cream, a conical lower section formed integrally with the upper section, the exterior diameter of the lower section being the same as the interior diameter of the upper section at the point of junction therebetween, said lower section being formed with openings through its side immediately below the lower end of the upper section, and a conoidal flange to be slipped over the lower section and be secured thereon immediately below said openings to receive drippings and direct them through the openings.

JOSEPH SCHOENFELD.